C. L. KELLING.
Coffee Roaster.
No. 34,968.
Patented April 15, 1862.
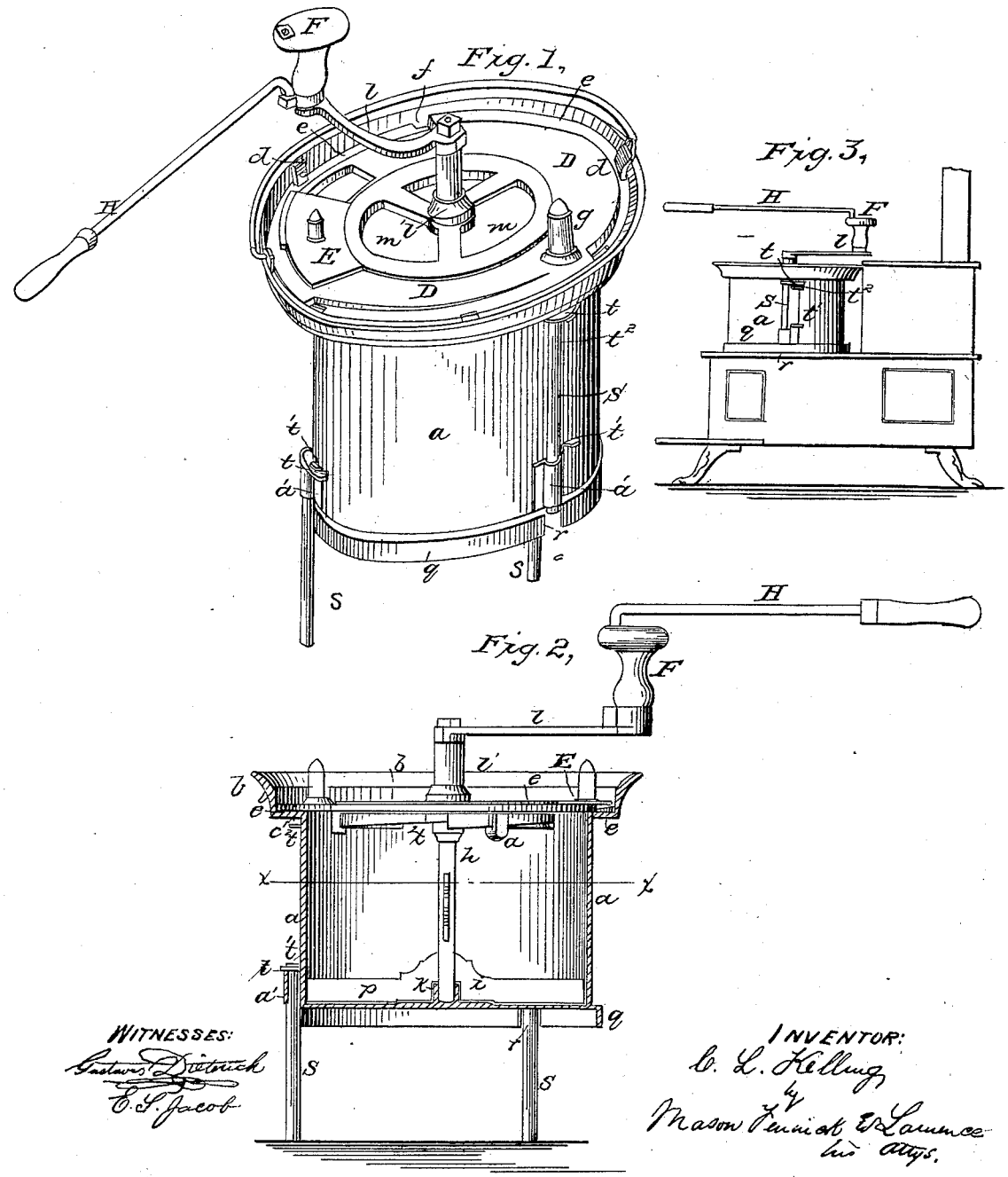

UNITED STATES PATENT OFFICE.

C. L. KELLING, OF MECHANICSBURG, PENNSYLVANIA.

IMPROVEMENT IN COFFEE-ROASTERS.

Specification forming part of Letters Patent No. 34,968, dated April 15, 1862.

*To all whom it may concern:*

Be it known that I, C. L. KELLING, of Mechanicsburg, in the county of Cumberland and State of Pennsylvania, have invented a new and Improved Apparatus for Roasting Coffee; and I do hereby declare that the following is a full and exact description thereof, reference being had to the accompanying drawings, and to the letters of reference marked thereon, like letters in the several figures indicating the same parts.

In the drawings, Figure 1 is a perspective view of my improved coffee-roaster; Fig. 2, a vertical section, and Fig. 3 a side elevation showing its use in connection with one of the top plates of an ordinary cooking-stove.

In order properly to prepare coffee for table use, and at the same time economize its desirable qualities, it is of prime importance that the berry should be brought to a brownish hue without burning it, and that the aroma expelled by the heat should be constantly in contact with the berry during the process of "roasting." So treated, the coffee is allowed to cool in the vessel in which it is roasted, reabsorbs the moisture expelled by the heat, and the aroma is in a great measure returned to the berry, the moisture during the act of roasting becoming impregnated, as it were, with the expelled aroma, and being returned to the berry by absorption in the process of cooling. To thoroughly effect this, however, it is necessary that the coffee should be roasted in an air-tight vessel, and at the same time provision must be made whereby the burning of the coffee can be avoided, else the bitter and disagreeable taste generated by burning will be imparted to the berry, and thus the desired effect of the roasting will be lost. To accomplish this, and by the readiest auxiliary means in common use—to wit, a stove—and at the same time make provision whereby the end sought may be attained in a great measure by the use of the common fire-place, is the object of my invention.

In the drawings, $a$ indicates a cylindrical metallic vessel of a proper size for a charge of coffee to be roasted, and having a circumferential flaring rim $b$ attached, so as to form a shoulder $c$, as represented in Fig. 2, upon which a cover D rests when the apparatus is in use. This rim is armed at three or more points with lugs, as at $d$, beneath which and above the shoulder $c$ the periphery of the cover D is made to engage by means of inclined planes $e$, formed upon said cover. In the edge of the cover slots $f$ are cut out, so that the cover when being placed in position upon the vessel $a$ will pass the lugs $d$, whereupon the operator, by pressing his finger upon the projecting pin $g$ and in the proper lateral direction, will cause the inclined planes of the cover to pass between the lugs $d$ and shoulder $c$, and thus form an air-tight joint between the cover and the body $a$. The cover D is also provided with a central shaft $h$, armed with agitators $i\ i'$, the lower end of the shaft taking into a socket $k$, as indicated in Fig. 2, and the upper end receiving a hand-crank $l$, as shown in the figure, and by means of which the coffee is stirred in the act of roasting. A bearing $l^2$ is secured upon the shaft $h$, upon which the cover D in part rests when in place, and by means of which it may be removed from the vessel $a$.

The central portion of the cover D is formed with mica windows $m$, the mica being confined to the under side of the cover by means of an inclined-plane ring N and lugs $d'$, as represented in Fig. 2, thus securing between the mica sheet and cover D an air-tight joint. As the frame-work of the windows $m$ terminate in a central bearing or hub $l'$, through which the shaft $h$ passes, and within which it is accurately fitted to revolve, a secure and tight joint is thus also formed to prevent the escape of the aroma of the roasting coffee.

It is of course obvious that the windows $m$ may be placed in any other portion of the cover D than immediately around the shaft $h$, and thus permit the operator to witness the operation of roasting, and for testing the coffee during the process without necessitating the removal of the cover D, I have provided a sliding door E, as indicated in Fig. 1.

It will be observed that at the lower portion of the vessel $a$, and beneath its bottom $p$, the diameter of my coffee-roaster is enlarged by the addition of a rim $q$, having ventilating-passages $r$ therein, so that when the apparatus is placed upon the top plate of a stove, as shown in Fig. 3, a ventilated hot-air chamber will be formed between the plate of the stove and the bottom $p$ of the roaster. By these means a too powerful heat in the stove will be prevented from burning the coffee in contact with the bottom $p$, and the main body of the coffee in the vessel $a$—say as high up as the line $x\,x$, Fig. 2—will be interposed between a strata of heated air both from above and below, the former being inside and the latter outside the roaster. By the circulation of air through the ventilators $r$ the lower strata is constantly tempered and the upper strata preserved from overheating. The coffee is thus roasted with great uniformity, and the moisture and aroma expelled from the berry by the heat are preserved in contact and constantly intermingled with the whole mass by the agitators $i\,i'$ through the turning of the shaft $h$ and crank $l$.

It sometimes happens that it is necessary to economize time in the process of roasting—in other words, to do the roasting of the coffee in a "hurry"—in which case the roaster, instead of being placed upon one of the top plates of a stove, as in Fig. 3, will be placed within the oven. To provide for the agitation of the coffee under such circumstances, I supply the handle F with sockets $b'\,b^2$, fitted to receive the bent end of a turning-rod H, so that the roaster when within the oven can be operated without liability of burning the hand of the operator against the sides of the oven; but whether the roaster be placed in the stove or on its top still the rod H is advantageous, since the hand of the operator by its use is less exposed to the action of the heat.

To provide for the use of my roaster in connection with an ordinary fire-place I apply sliding legs $s$, having their upper extremities terminating in flattened hooks $t$, so that when the legs are slid down through the hasps $a'$ the hooks $t$ may be turned beneath projections $t'$, and thus support the roaster over a body of coals drawn out upon the hearth of the fire-place; but when the roaster is used as shown in Fig. 3 the legs $s$ are shoved up alongside of the body $a$, and the hooks $t$ turned in between the shoulder $c$ and projections $t^2$, as indicated in Fig. 1.

Having thus described my improved coffee-roaster, what I claim as new, and desire to secure by Letters Patent of the United States, is—

1. The sliding legs $s$, in combination with the hasps $a'$, projections $t'\,t^2$, and cylinder $a$, substantially in the manner and for the purpose specified.

2. In combination with the cylinder or vessel $a$ and its bottom $p$, the enlarged rim $q$, having ventilating-passages $r$ therein, in the manner and for the purpose set forth.

Witness my hand in the matter of my application for a patent for an improved coffee-roaster this 21st day of February A. D. 1862.

C. L. KELLING.

Witnesses:
 GUSTAVUS DIETERICH,
 E. S. JACOB.